(12) United States Patent
Chen

(10) Patent No.: US 7,875,680 B2
(45) Date of Patent: *Jan. 25, 2011

(54) EVA BLEND COMPOSITIONS SUITABLE FOR RF WELDING APPLICATIONS

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/077,585

(22) Filed: Mar. 20, 2008

(65) Prior Publication Data

US 2008/0171165 A1 Jul. 17, 2008

Related U.S. Application Data

(63) Continuation of application No. 11/127,563, filed on May 12, 2005, now abandoned.

(60) Provisional application No. 60/570,550, filed on May 12, 2004.

(51) Int. Cl.
*C08L 23/00* (2006.01)
*C08L 23/04* (2006.01)
*C08L 23/10* (2006.01)

(52) U.S. Cl. ................ 525/191; 525/221; 525/222; 525/240

(58) Field of Classification Search .......... 525/191, 525/221, 222, 240
See application file for complete search history.

(56) References Cited

U.S. PATENT DOCUMENTS

| | | | |
|---|---|---|---|
| 5,373,027 A * | 12/1994 | Hanley et al. .............. 521/84.1 |
| 5,789,475 A | 8/1998 | Chen |
| 5,973,046 A | 10/1999 | Chen |
| 5,994,470 A | 11/1999 | Tanaka et al. |
| 6,100,321 A | 8/2000 | Chen |
| 6,100,340 A | 8/2000 | Rajagopalan et al. |
| 6,197,884 B1 | 3/2001 | Rajagopalan et al. |
| 6,653,382 B1 | 11/2003 | Statz et al. |
| 6,762,246 B2 * | 7/2004 | Chen ......................... 525/194 |
| 6,777,472 B1 | 8/2004 | Statz et al. |
| 6,815,480 B2 | 11/2004 | Statz et al. |
| 6,894,097 B2 | 5/2005 | Takesue et al. |
| 6,953,820 B2 | 10/2005 | Statz et al. |
| 6,962,951 B1 | 11/2005 | Takesue et al. |
| 7,045,566 B2 | 5/2006 | Chen et al. |
| 7,238,737 B2 | 7/2007 | Chen |
| 7,365,116 B2 * | 4/2008 | Chen ......................... 524/300 |
| 7,375,151 B2 | 5/2008 | Statz et al. |
| 7,422,796 B2 * | 9/2008 | Chen ......................... 428/515 |
| 2002/0045027 A1 | 4/2002 | Sawada et al. |
| 2002/0091188 A1 | 7/2002 | Statz et al. |
| 2003/0050373 A1 | 3/2003 | Chen |
| 2003/0158312 A1 | 8/2003 | Chen et al. |
| 2003/0181260 A1 | 9/2003 | Rajagopalan et al. |
| 2003/0181595 A1 | 9/2003 | Chen |
| 2003/0198715 A1 | 10/2003 | Morris et al. |
| 2004/0132899 A1 * | 7/2004 | Sullivan .................... 524/590 |
| 2005/0020741 A1 | 1/2005 | Chen |
| 2005/0124741 A1 | 6/2005 | Chen |
| 2005/0256268 A1 | 11/2005 | Chen |
| 2005/0267240 A1 | 12/2005 | Chen |
| 2007/0020415 A1 | 1/2007 | Chen |
| 2007/0020466 A1 | 1/2007 | Chen |
| 2007/0078223 A1 | 4/2007 | Chen et al. |
| 2007/0203277 A1 | 8/2007 | Chen |
| 2007/0207332 A1 | 9/2007 | Chen |
| 2007/0283652 A1 | 12/2007 | Chen et al. |
| 2007/0287019 A1 | 12/2007 | Chen et al. |
| 2008/0020158 A1 | 1/2008 | Chen |
| 2008/0081710 A1 | 4/2008 | Chen et al. |
| 2008/0160280 A1 | 7/2008 | Chen et al. |

FOREIGN PATENT DOCUMENTS

| WO | WO 01/29129 A1 | 4/2001 |
|---|---|---|
| WO | WO 2004/050362 A1 | 6/2004 |
| WO | WO 2004/108817 A1 | 12/2004 |

OTHER PUBLICATIONS

U.S. Appl. No. 60/425,604, filed Nov. 12, 2002, Chen et al.
U.S. Appl. No. 10/704,934, filed Nov. 11, 2003, Minnick et al.
U.S. Appl. No. 11/506,731, filed Aug. 18, 2006, Chen et al.
U.S. Appl. No. 61/001,454, filed Nov. 1, 2007, de Garavilla.
U.S. Appl. No. 61/005,239, filed Dec. 3, 2007, Visioli et al.
U.S. Appl. No. 12/150,173, filed Apr. 24, 2008, Renken et al.
PCT International Search Report for International Application No. PCT/US2005/017015 dated Dec. 5, 2005.

* cited by examiner

*Primary Examiner*—Nathan M Nutter

(57) ABSTRACT

Disclosed are films obtained from blends of ethylene copolymers with organic acid salt-modified potassium ionomeric copolymers. The films of the present invention can be welded using RF energy.

11 Claims, No Drawings

EVA BLEND COMPOSITIONS SUITABLE FOR RF WELDING APPLICATIONS

This is a continuation of prior application Ser. No. 11/127,563, filed May 12, 2005 which claims the benefit of U.S. Provisional Application No. 60/570,550, filed May 12, 2004, now expired, the entire contents being incorporated herein by reference.

FIELD OF THE INVENTION

This invention relates to polymer compositions that absorb radio frequency energy. More particularly, this invention relates to films obtained from polymer compositions that can be welded using radio frequency energy.

BACKGROUND DISCUSSION AND RELATED ART

In packaging applications, it can sometimes be desirable to seal a film package without the use of a separate adhesive film layer on the package. Such a sealing process can be obtained by using materials that can be self-adhered, or materials that can be made to adhere to or to adhere to another material. One such process is a process by which radio frequency (RF) energy is applied to a suitable material, and after absorption of the RF energy the material can subsequently be self-adhered, or adhered to different substrates to form a seal. This process is known as RF welding, and suitable materials for such a process are known in commercial practice. Polyvinyl chloride (PVC), for example, is a material that can be susceptible to RF energy and be very suitable for RF welding. PVC, however, is not an acceptable material for widespread use in some areas of the world and alternate materials are needed to perform the function of PVC in those regions where PVC is not desirable.

Selecting suitable alternate materials for use in packaging applications that use the RF welding technique is not a trivial exercise. In selecting or developing suitable alternative materials, at least three (3) criteria need to be met. First, the material must provide good physical and/or mechanical characteristics that are satisfactory for a package or a component thereof. Second, a suitable polymer film should be susceptible, that is should absorb, RF energy. Third, the polymer film should be capable of forming a bond, weld, or seal, when subjected to RF energy under the proper conditions of pressure and time.

Various polymers suitable for use in packaging applications are well known. For example, polyolefins such as polyethylene and polypropylene are useful in packaging. Some polymeric materials are known to be susceptible to RF energy. However, other materials may not be suitable for use in the applications described herein due to prohibitive cost or other problems. For example, some materials can be susceptible to RF energy but are not capable of forming a seal, or weld. Some materials can require more stringent process conditions, or require that a component be increased to the detriment of other physical/mechanical properties. The susceptibility of EVA, for example, is highly dependent on the vinyl acetate content. Typically ethylene (meth)acrylic acid copolymers and their ionomers are not RF susceptible.

Mixtures of ionomers and polar solvents such as glycerol can produce compositions that absorb RF energy. However, use of solvents having considerable vapor pressure at extrusion temperatures can lead to other problems, such as fogging during processing. Also, use of polar solvents can be undesirable for environmental reasons.

It can be desirable to have a composition that absorbs RF energy, and can be sealed using RF welding, while yet having physical and mechanical properties suitable for use in packaging applications.

SUMMARY OF THE INVENTION

In one aspect, the present invention is a film that absorbs radio frequency (RF) energy wherein the film comprises:

(a) a blend comprising (i) at least one E/X/Y copolymer where E is ethylene, X is a $C_3$ to $C_8$ $\alpha,\beta$ ethylenically unsaturated carboxylic acid, and Y is a softening comonomer selected from alkyl acrylate and alkyl methacrylate wherein the alkyl groups have from one to eight carbon atoms, wherein X is about 2-30 weight % of the E/X/Y copolymer and Y is about 0-40 weight % of the E/X/Y copolymer, wherein the acid component (X) can be present in either the fully neutralized carboxylate salt form or the partially neutralized carboxylate salt form, and (ii) one or more organic acids or salts thereof; wherein the combined carboxylate salt functionalities of the blend are at least partially neutralized by potassium; and (iii) one or more polar compounds selected from polyols and polyesters; and, (b) optionally at least one other polymeric component, wherein the film absorbs radio frequency (RF) energy.

DETAILED DESCRIPTION OF THE INVENTION

In one embodiment, the present invention is a polymeric film obtained from a blend comprising an acid copolymer ionomer and a fatty acid salt. A film of the present invention is at least about 0.001 mil thick. Preferably the film is from at least about 1 mil thick to about 25 mil thick.

Films of the present invention comprise acid copolymer ionomers ("ionomers"), which are copolymers well known in the polymer art. Ionomers are ionic copolymers formed by copolymerization of an $\alpha$-olefin—such as ethylene, propylene, 1-butene, and other 1-unsaturated hydrocarbons—with an unsaturated carboxylic acid, such as for example acrylic acid, methacrylic acid, or maleic acid, and optionally softening comonomers, in which some portion of the acidic groups in the copolymer is neutralized with metal ions such as sodium or zinc. As used herein, the term "copolymers" can describe polymers obtained by copolymerization of at least two different monomer species. The term "terpolymer" can be used to specifically describe a copolymer that is obtained from copolymerization of three different monomer species. At least one alkali metal, transition metal, or alkaline earth metal cation, such as lithium, sodium, potassium, magnesium, calcium, or zinc, or a combination of such cations, can be the counterion that neutralizes the carboxylate anion of the salt. Particularly preferred are ionomers that are at least partially neutralized with potassium cations. Terpolymers can also be made from an olefin such as ethylene, an unsaturated carboxylic acid and a softening comonomer such as an alkyl (meth)acrylate providing "softer" resins which can be neutralized to form softer ionomers.

A blend useful in the practice of the present invention comprises at least one E/X/Y acid copolymer composition where E is ethylene, X is a $C_3$ to $C_8$ $\alpha,\beta$ ethylenically unsaturated carboxylic acid, and Y is a softening comonomer selected from alkyl acrylate and alkyl methacrylate wherein the alkyl groups have from one to eight carbon atoms, wherein X is about 2-30 weight % of the E/X/Y copolymer and Y can be present in an amount of from about 0 to about 40 weight % of the E/X/Y copolymer. The acid copolymers can be fully or partially neutralized by known and conventional means to provide acid copolymer ionomers (ionomers). Ionomers suitable for use in the practice of the present invention are known and commercially available from E. I. du Pont de Nemours and Company under the tradename of Surlyn®.

Additionally, films of the present invention comprise an organic acid or a salt thereof (organic salt). In the practice of the present invention, reference to an organic acid can also refer to the salt of the acid, or a mixture of the acid and the salt. Blends useful in the practice of the present invention include at least about 5 wt % of the organic acid. Preferably the blends include from about 5 wt % up to about 50 wt % of an organic acid. More preferably the blends include at least about 10 wt % of the organic acid, even more preferably at least about 20 wt %, and most preferably at least about 30 wt % of the organic acid and/or salt thereof. The counter ions of the organic salts are preferably at least in part potassium ion. Preferably, greater than 70% of all the acid components in the blend are neutralized, more preferably greater than 90% are neutralized. Most preferably, 100% of all the acid components in the blend are neutralized.

The organic acids of the present invention are particularly those that are non-volatile and non-migratory, for example acids comprising from about 6 to about 38 carbon atoms. Non-limiting, illustrative examples of organic acids are stearic acid and isomers thereof, oleic acid and isomers thereof, erucic acid and isomers thereof and behenic acid and isomers thereof. Stearic and oleic acids and their isomers are preferred. Even more preferred are branched isomers of suitable organic acids such as branched isomers of stearic and oleic acids, such as isostearic acid and isooleic acid, for example. A more complete description of suitable acids and blends for use in the present invention can be found in U.S. Published Patent Application 2005/0037216 A1, published Feb. 17, 2005, fully incorporated herein by reference thereto. Preferably, the organic acids are neutralized and have a counterion selected from the group consisting of: potassium (K), sodium (Na), lithium (Li), rubidium (Rb), and magnesium (Mg) ions. More preferably the counter ion is K.

In a preferred embodiment, the present invention includes as the organic acid an isomer of a $C_6$ to $C_{38}$ organic acid. Particularly preferred are isomers of oleic acid such as 2-methyl oleic acid (isooleic acid), and isomers of stearic acid such as 2-methyl stearic acid (isostearic acid). Also preferred for use in the practice of the present invention are functionalized fatty acids such as, for example, amino- and hydroxyl-functionalized fatty acids. Hydroxystearic acids such as 12-hydroxy stearic acid, for example, can be a preferred functionalized fatty acid.

A suitable blend for use in the practice of the present invention can comprise optional polymeric components. Such optional components can include a second ionomeric copolymer, including dipolymer ionomers and terpolymer ionomers; and/or thermoplastic resins. The thermoplastic resins would, by way of non-limiting illustrative examples, include thermoplastic elastomers, such as polyurethanes, poly-ether-esters, poly-amide-ethers, polyether-ureas, PEBAX (a family of block copolymers based on polyether-block-amide, commercially supplied by Atochem); styrene-butadiene-styrene (SBS) block copolymers; styrene (ethylene-butylene)-styrene block copolymers; polyamides (oligomeric and polymeric); polyesters; polyvinyl alcohol; polyolefins including polyethylene, polypropylene, ethylene/propylene copolymers; ethylene copolymers with various comonomers, such as ethylene/vinyl acetate, ethylene/(meth) acrylates, ethylene/(meth)acrylic acid, ethylene/epoxy-functionalized monomer, ethylene/CO, ethylene/vinyl alcohol (polyols); functionalized polymers with grafted maleic anhydride functionality and epoxidized polymers; elastomers, such as EPDM, metallocene catalyzed PE and copolymer, ground up powders of the thermoset elastomers. The optional second polymer component can be a blend comprising at least one any of these materials, including those materials that are not susceptible to RF radiation.

Preferably the second component is a copolymer of ethylene such as for example, ethylene copolymers with various comonomers, such as ethylene/vinyl acetate, ethylene/(meth) acrylates, ethylene/(meth)acrylic acid and ionomers thereof, ethylene/epoxy-functionalized monomer, ethylene/CO, ethylene/vinyl alcohol, or a blend comprising at least one of these. More preferably, the second polymer component is a selected from the group consisting of: ethylene vinyl acetate (EVA); ethylene/alkyl acrylates; ethylene/(meth)acrylic acid and ionomers thereof; or a blend comprising at least one of these.

If included, the amount of the optional polymer component is preferably included in an amount of 99% by weight to about 1% by weight of the whole potassium ionomer composition. Preferably, the optional polymer component is included in an amount of from about 95 wt % to about 50 wt %, more preferably in an amount of from about 93 wt % to about 70 wt %.

The films of the present invention can be used in monolayer or multilayer structures. The films of the present invention can be useful in such packaging applications as film wraps, containers, and lids without limitation thereto.

Examples of the unsaturated carboxylic acid include acrylic acid, methacrylic acid, fumaric acid, maleic anhydride, monomethyl maleate, monoethyl maleate. Particularly preferred are acrylic acid and/or methacrylic acid. Examples of polar monomers that can serve as copolymerization components include vinyl esters such as vinyl acetate and vinyl propionate; unsaturated carboxylic acid esters such as methyl acrylate, ethyl acrylate, isopropyl acrylate, n-butyl acrylate, isobutyl acrylate, n-hexyl acrylate, isooctyl acrylate, methyl methacrylate, dimethyl maleate and diethyl maleate; carbon monoxide. In particular, unsaturated carboxylic acid esters are suitable copolymerization components.

EXAMPLES

Materials Used

Elvaloy AC1224 is a copolymer blend of ethylene vinyl acetate and ethylene methacrylic acid copolymers, each available from E. I. du Pont de Nemours and Company (DuPont).

Glycerol monostearate (GMS) (or potentially esters of polyglycerols), or sorbitol monostearate can be useful in the practice of the present invention.

General Procedures

Films of blends were prepared by blending copolymers of Elvaloy® AC1224, commercially available from DuPont, with different levels of the RF enhancers, between 5% and 15%, and extruding the blends on a prism extruder to produce film between 6 and 12-mil thick, and these were tested for weldability. Two layers of the film were backed by Kapton® sheet and placed between the electrodes of an RF source, under a slight positive pressure and exposed for generally 2 seconds.

Dielectric measurements can be used to measure RF adsorption. Alternatively a simple relative method is to measure the effect of introducing a material into the capacitance area of an alternating signal and measure the effect on the signal width or 'Q value' (frequency divided by width). A lowering of the Q value indicates adsorption, and since this is relative for a given circuit a percentage lowering of Q is a useful value. Welding experiments can be carried out, by subjecting a pair of film samples to an alternating field, for a fixed time, under a certain pressure.

TABLE 1

|  | % Reduction in Q |
|---|---|
| PVC (average of 9 determinations) 9 mil | 12.4 +/− 3 |
| PVC filled, heavily plasticized (average of 3) 9 mil | 18.8 +/− 2 |
| Elvaloy*AC1224 (average of 5) 6 mil | 19.7 +/− 3 |
| Elvax*3170, 18 mil | 18.8 |
| Surlyn*8140 | 8 |
| Surlyn*8150 + 20% glycerol 6 mil | 60 (up to 50% humidity) 95 (75% humidity) |
| Surlyn*8150 + 20% GMS | 13 (up to 50% humidity) |
| Surlyn*8140 + 30% potassium 12-hydroxystearate | 78 (up to 50% humidity) 96 (75% humidity) |
| Surlyn*8140 + 20% potassium iso-stearate | 89 (25% humidity) 95 (75% humidity) |

The weld performance was rated on an arbitrary scale. A value of 4 is standard for conventional weldable compositions. Factors such as film thickness, time and voltage can affect the results.
0 - Negligible adhesion between the films
1 - Noticeable adhesion
2 - Sufficient adhesion to deform the film on peeling
3 - Tearing of the film instead of peeling along some part of weld
4 - Tearing of the film with no peeling along entire weld
A selection of the results obtained were:

| PVC | | 4 |
|---|---|---|
| Highly plasticized, filled PVC | | 4 |
| Elvaloy*AC1224 | | 0 |
| AC1224 + 10% (Surlyn ® + glycerol) | 25% humidity 75% humidity | 4 4 |
| AC1224 + 10% (Surlyn ® + GMS) | 25% humidity 75% humidity | 1 2 |
| AC1224 + 10% (Surlyn ® + K hydroxy stearate) | 25% humidity 75% humidity | 3 3 |
| Elvax*3170 | 20% humidity | 1 (at 3-4 kV/3 s) 3 (at 4.5 kV/3 s) |
| Elvax*3170 + 10% (Surlyn ® + K iso-St*) | 50% humidity | 3 (at 3.2 kV/2.5 s) |
| Elvax*3170 + 20% (Surlyn ® + K iso-St) | 50% humidity | 4 (at 2.8 kV/1 s) |
| Elvax*3170 + 30% (Surlyn ® + K iso-St).) | 50% humidity | 4 (at 2 kV/1 s) |

|  |  | % Q-value reduction |
|---|---|---|
| SiSt[1] | (25% RH) (50% RH) (75% RH) | 89% 95% 96% |
| Ex. A1: Elvax 3170/10% SiSt | (25% RH) (50% RH) (75% RH) | 15% 59% 43% |
| Ex. A2: Elvax 3170/20% SiSt | (25% RH) (50% RH) (75% RH) | 53% 80% 49% |
| Ex. A3: Elvax 3170/30% SiSt | (25% RH) (50% RH) (75% RH) | 86% 89% 90%.) |

| Welding test: | Welding rating |
|---|---|
| Ex. A1: | 3 (at 3.2 Kvolt/2.5 sec.) |
| Ex. A2: | 4 (at 2.8 Kvolt/1 sec.) |
| Ex. A3: | 4 (at 2.0 Kvolt/1 sec.) |
| Elvax 3170 | 1-2 (at ~3.5 Kvolt/3 sec.) |

*potassium isostearate
[1]Surlyn ® 8140/20% K iso-St

What is claimed is:

1. A film having a thickness of at least about 0.001 mil to about 25 mil that absorbs radio frequency energy consisting essentially of
   A. a first component comprising a mixture of
      1. at least one polymer selected from the group consisting of E/X/Y copolymers, ionomers of E/X/Y copolymers and mixtures thereof, where E is ethylene, X is a $C_3$ to $C_8$ α,β-ethylenically unsaturated carboxylic acid and Y is a comonomer selected from the group consisting of alkyl acrylates and alkyl methacrylates having alkyl groups of from one to eight carbon atoms, wherein said E/X/Y copolymers comprise from about 2-30 weight %, based on the weight of the E/X/Y copolymer, of copolymerized units of X and from about 0-40 weight %, based on the weight of the E/X/Y copolymer, of copolymerized units of Y, and
      2. a material selected from the group consisting of organic carboxylic acids having from about 6 to about 38 carbon atoms, salts of said organic carboxylic acids and mixtures thereof;
   wherein the combined carboxylic acid groups present in said polymer and said material of said first component are neutralized to a level of at least 70% by potassium ions; and
   B. a second component in an amount of from 50-95 wt. %, based on the total weight of said first and second components, wherein i) said second component is different from said at least one polymer of said first component and ii) said second component is selected from the group consisting of ethylene vinyl acetate copolymers, ethylene copolymers having copolymerized epoxy-functionalized monomer units, ethylene carbon monoxide copolymers, ethylene vinyl alcohol copolymers and mixtures thereof.

2. The film of claim 1 wherein the second component is present in an amount of from about 70 to about 93 wt %, based on the total weight of the first and second components.

3. An article selected from the group consisting of film wraps, containers and lids, wherein said article comprises a film having a thickness of at least about 0.001 mil to about 25 mil comprising
   A. a first component consisting essentially of a mixture of
      1. at least one polymer selected from the group consisting of E/X/Y copolymers, ionomers of E/X/Y copolymers and mixtures thereof, where E is ethylene, X is a $C_3$ to $C_8$ α,β-ethylenically unsaturated carboxylic acid and Y is a comonomer selected from the group consisting of alkyl acrylates and alkyl methacrylates having alkyl groups of from one to eight carbon atoms, wherein said copolymers comprise from about 2-30 weight %, based on the weight of the E/X/Y copolymer, of copolymerized units of X and from about 0-40 weight %, based on the weight of the E/X/Y copolymer, of copolymerized units of Y, and
      2. a material selected from the group consisting of organic carboxylic acids having from about 6 to about 38 carbon atoms, salts of said carboxylic acids and mixtures thereof;
   wherein the combined carboxylic acid groups present in said polymer and said material of said first component are neutralized to a level of at least 70% by potassium ions; and
   B. a second component in an amount of from 50-95 wt. %, based on the total weight of said first and second components, wherein i) said second component is different from said at least one polymer of said first component and ii) said second component is selected from the group consisting of ethylene vinyl acetate copolymers, ethylene copolymers having copolymerized epoxy-functionalized monomer units, ethylene carbon monoxide copolymers, ethylene vinyl alcohol copolymers and mixtures thereof.

4. The film of claim 1 wherein the first component comprises a mixture of a first ionomer of an E/X/Y copolymer and at least one additional ionomer of an E/X/Y copolymer that is different from said first ionomer.

5. The film of claim 1 wherein the second component is an ethylene vinyl acetate copolymer.

6. The film of claim 1 wherein the second component is an ethylene copolymer having copolymerized epoxy-functionalized monomer units.

7. The film of claim 1 wherein the second component is an ethylene carbon monoxide copolymer.

8. The film of claim 1 wherein the second component is an ethylene vinyl alcohol copolymer.

9. The film of claim 1 wherein the combined carboxylic acid groups present in said polymer and said material of said first component are neutralized solely by potassium ions.

10. A film wrap of claim 3.

11. A film of claim 1 having a thickness of about 6 mil to about 12 mil.

* * * * *